United States Patent
Sadowski et al.

(10) Patent No.: US 8,949,554 B2
(45) Date of Patent: Feb. 3, 2015

(54) IDLE POWER CONTROL IN MULTI-DISPLAY SYSTEMS

(75) Inventors: Greg Sadowski, Cambridge, MA (US); Stephen Presant, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 516 days.

(21) Appl. No.: 13/308,547

(22) Filed: Dec. 1, 2011

(65) Prior Publication Data

US 2013/0145107 A1 Jun. 6, 2013

(51) Int. Cl.
*G06F 13/00* (2006.01)
*G06F 13/28* (2006.01)

(52) U.S. Cl.
USPC ............... 711/157; 711/165; 711/E12.079

(58) Field of Classification Search
CPC .... G06F 12/0607; G06F 1/3265; G09G 5/397
USPC ................... 711/157, 165, E12.079
See application file for complete search history.

(56) References Cited

U.S. PATENT DOCUMENTS

| | | | |
|---|---|---|---|
| 2009/0235105 A1 | 9/2009 | Branover et al. | |
| 2009/0300299 A1* | 12/2009 | Saxe et al. | 711/157 |
| 2010/0058078 A1 | 3/2010 | Branover et al. | |
| 2010/0287394 A1 | 11/2010 | Branover et al. | |
| 2011/0078478 A1 | 3/2011 | Branover et al. | |
| 2011/0320751 A1* | 12/2011 | Wang et al. | 711/157 |

OTHER PUBLICATIONS

2nd Generation Intel Core Processor Family Desktop: Datasheet, vol. 1, Supporting Intel Core i7, i5 and i3 Desktop Processor Series, Intel, Jan. 2011, 110 pages.

* cited by examiner

*Primary Examiner* — Edward Dudek, Jr.
(74) *Attorney, Agent, or Firm* — Rory D. Rankin; Meyertons, Hood, Kivlin, Kowert & Goetzel, P.C.

(57) ABSTRACT

A system and method for reducing power consumption of a video subsystem. A computer system includes multiple display devices supported by a graphics processor. A memory for storing video data for the multiple display devices utilizes multiple channels for higher bandwidth. A systems controller within the graphics processor determines a retraining condition, such as an idle power state, is satisfied for one or more channels of the multiple memory channels. The graphics processor divides each respective screen for the multiple display devices into multiple horizontal bars. For each one of the multiple horizontal bars, the corresponding data may be rearranged from being distributed across the multiple channels to being stored in a single one of the multiple channels. The systems controller determines a given channel is an upcoming free channel. This free channel is retrained while it is free. Retraining may include at least reducing its memory clock (MCLK) frequency.

20 Claims, 10 Drawing Sheets

IDLE POWER CONTROL IN MULTI-DISPLAY SYSTEMS

BACKGROUND

1. Field of the Invention

This invention relates to electronic circuits, and more particularly, to reducing power consumption of a video subsystem.

2. Description of the Relevant Art

Multiple-display technology enables a single graphics processing unit (GPU) to simultaneously support multiple independent display outputs. In one example, a computing system may independently connect up to six high-resolution displays in various combinations of landscape and portrait orientations. Two or more of the six monitors may be grouped into a large integrated display surface. This "surround-sight" feature provides an expanded visual workspace. Gaming, entertainment, medical, audio and video editing, business and other applications may take advantage of the expanded visual workspace and increase multitasking opportunities.

For each supported display, a video subsystem maintains a respective frame buffer that stores data, such as one or more video frames, which may be stored in dynamic random access memory (DRAM). For each supported display, a video controller reads data via a given one of one or more DRAM interfaces for access to a respective frame buffer. A memory clock (MCLK) is typically used to control a data rate into the frame buffer within the DRAM.

Computing systems may generally set the MCLK to a maximum frequency in order to maximize the data rate. Changing the MCLK frequency, such as decreasing its value to reduce power consumption, may utilize a training session with the DRAM interface. However, in various cases, a DRAM interface that is not currently being utilized may not be free for a sufficient duration of time to retrain the DRAM interface. Therefore, in some systems the MCLK remains at a maximum frequency even during periods of non-use or low activity. The power consumption during these periods of time for multiple displays may be significant.

As power consumption increases for modern integrated circuits (ICs), more costly cooling systems such as larger fans, larger heat sinks and systems to control ambient temperature are utilized to remove excess heat and prevent IC failure. International standards and programs have been created to reduce energy consumption in various products including computer products. These programs provide labels to identify and guide customers in purchasing qualifying energy efficient products. The Energy Star program is one such program. These programs have been estimated to save billions of dollars in energy costs on a yearly basis.

The DRAM may have a low power "self-refresh" mode in which the DRAM internally generates refresh cycles used to maintain the integrity of the data stored in the DRAM frame buffer. However, to use such refresh cycles, stored data is not generally accessible. Further, employing the low power self-refresh mode is generally performed after reconfiguring the MCLK to a lower frequency to allow for low latency transitions in and out of the low power mode. Again, the DRAM interface may not be free for a sufficient duration of time to retrain the DRAM interface and lower the MCLK frequency.

In view of the above, efficient methods and systems for reducing power consumption of a video subsystem are desired.

SUMMARY OF EMBODIMENTS OF THE INVENTION

Systems and methods for reducing power consumption in a video subsystem are contemplated.

In one embodiment, a computer system includes multiple display devices supported by circuitry, such as a graphics processor. The computer system includes memory for storing display buffer data for the multiple display devices. The memory utilizes multiple interfaces, or channels, for higher bandwidth. In addition, the graphics processor may be configured to determine a retraining condition is satisfied for one or more channels of the multiple memory channels. The retraining condition may be a detected condition that indicates retraining of one or more memory channels may begin. Retraining, or maintenance, may include changing a memory clock (MCLK) frequency, changing a delay or phase of one or more memory interface signals, and so forth. In various embodiments, a retraining condition may be an idle power state due to detected user inactivity. In other embodiments, a retraining condition may be a period of low user activity. In further embodiments, the retraining condition may be an excessive power consumption measurement, a high error rate, and so forth.

Control circuitry within the graphics processor may divide each respective screen for the multiple display devices into multiple horizontal bars. For each one of the multiple horizontal bars within a given respective screen, the corresponding data may be rearranged from being distributed across the multiple memory channels to being stored in a single one of the multiple memory channels. The data rearrangement may create opportunities to retrain a given memory channel as no display is using the given channel to refresh its associated screen. A given display refreshes its screen by accessing a single memory channel corresponding to the current horizontal bar rather than accessing multiple memory channels for each scan line. in a horizontal bar rather than ain sequentially one horizontal scan line at a time. While the given display is accessing this single memory channel corresponding to the current horizontal bar, the given display is not accessing multiple memory channels anymore. The circuitry may further be configured to determine an upcoming free channel. A free channel is a channel not accessed for data to be used for rendering and being presented to any one of the display devices. Such a free channel may be retrained and/or maintained while it is free. During retraining or maintenance, the channel is unavailable for corresponding data to be read or written.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
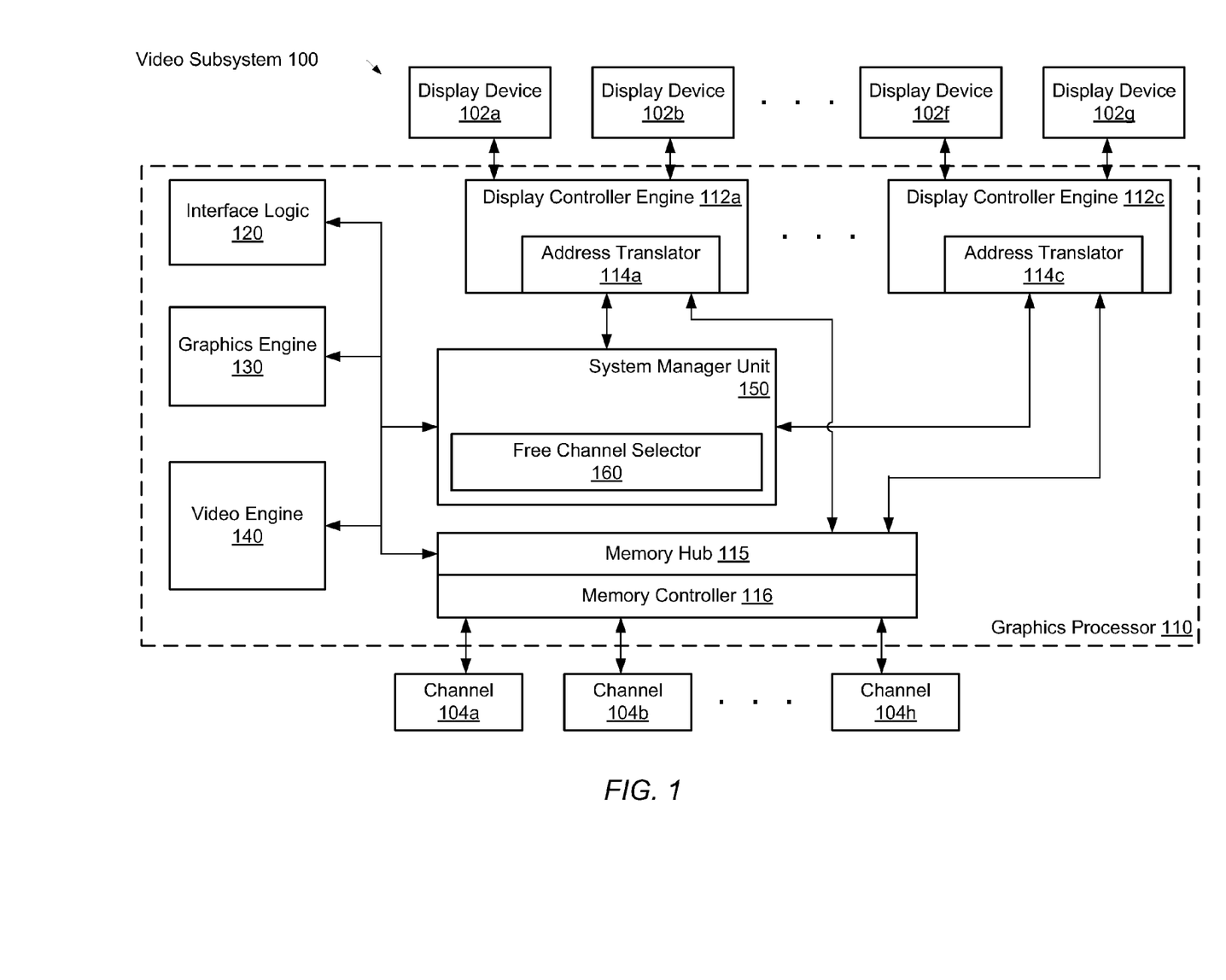
FIG. 1 is a generalized block diagram of one embodiment of a video subsystem.

Turning to FIG. 1, a generalized block diagram of one embodiment of a video subsystem 100 is shown. As shown, multiple display devices 102a-102g are connected to a graphics processor 110. As used herein, a graphics processor may also be referred to as a graphics processing unit (GPU) or processing unit. One or more memory channels 104a-104h may also be connected to the graphics processor 110. Each of the memory channels 104a-104h may be a separate interface to a memory, such as a dynamic random access memory (DRAM). As used herein, a memory channel may also be referred to as a channel.

Each of the display devices 102a-102g connected to the graphics processor 110 may have a respective frame buffer in the memory, such as the DRAM. A frame buffer may store data, such as video frames (which may include or consist of graphics), for a corresponding one of the display devices 102a-102g. Access to the data stored in the frame buffer may occur through one or more of the channels 104a-104h. The frame buffers may be stored in the dynamic random access memory (DRAM). For each supported one of the display devices 102a-102g, corresponding data may be read for access to a respective frame buffer via a given one of the channels 104a-104h. Each of the channels 104a-104h may include arbitration logic to allow multiple displays of the display devices 102a-102g to access it. A memory clock (MCLK) is used to control both the read and write data rate into the frame buffer within the DRAM. As will be appreciated, GPUs are capable of processing other types of data (frequently, although not exclusively, referred to as General Purpose GPU computing—GPGPU) and thus store data other than video in the DRAM typically used by the GPU as a frame buffer.

The graphics processor 110 includes multiple display controller engines (DCEs) 112a-112c for sending graphics output information to the display devices 102a-102g. In addition, the graphics processor 110 includes interface logic 120, a memory hub 115 and a memory controller 116 for supporting access to outside devices and memory. The memory hub 115 may include switching logic to connect a given one of the DCEs 112a-112c to the memory controller 116. The memory controller 116 may include logic for supporting a given protocol used to interface to the memory channels 104a-104h. In various embodiments, the hub 115 and memory controller 116 circuitry may be combined or implemented separately as desired. All such embodiments are contemplated. The graphics engine 130 and the video engine 140 may perform data-centric operations for at least graphics rendering and 3D graphics applications.

The system manager unit (SMU) 150 coordinates operations and communications among the multiple components within the graphics processor 110. In addition, the SMU 150 may detect when a video subsystem qualifies to transition to a low power mode or state. The low power mode may be responsive to an indication of user inactivity or user low activity. The low power mode may be one of several qualified retraining conditions for the channels 104a-104h. Other qualified retraining conditions may include determining a measured error rate, a measured temperature, or a measured power consumption exceeds a respective given threshold.

Retraining a given one of the channels 104a-104h may include at least one or more of changing the MCLK frequency and changing the phase, the delay, and/or the voltage level of other memory interface signals. In order to allow sufficient time for a retraining session for a given one of the channels 104a-104h, the SMU 150 may rearrange the data storage for the frame buffers. In one embodiment, the SMU 150 may divide a respective screen for each one of the display devices 102a-102g into a number of horizontal bars, wherein the number of horizontal bars may equal the number of channels 104a-104h connected to the graphics processor 110.

For a screen of a given one of the display devices 102a-102g, data for a corresponding horizontal bar may be stored in a distributed manner across the channels 104a-104h. The SMU 150 may copy this data distributed across the channels 104a-104h to memory locations in a given one of the channels 104a-104h (i.e., read and then (re)write the data). The SMU 150 may repeat this process for the other horizontal bars corresponding to this screen. Additionally, the SMU 150 may repeat this process for the other screens corresponding to the display devices 102a-102g. Control logic within either the SMU 150 or the address translators 114a-114c may remap the addresses to point to the new memory locations at the end of the copying procedure. The new addresses may be stored in the address translators 114a-114c.

When the rearranging of the video frame data is completed, the SMU 150 may determine a given one of the channels 104a-104h is free for a sufficient amount of time to complete a retraining session. The SMU 150 may retrain this given channel and repeat the process until each of the channels 104a-104h is retrained. When retraining of the channels 104a-104h is completed and the SMU 150 receives an indication that the idle power mode or other retraining condition has ended, the SMU 150 may copy the data from the new memory locations to the previous memory locations. The addresses stored in the address translators 114a-114c may be updated to point again to the previous memory locations. The memory interface may continue using the parameter values changed during the retraining session, such as a given signal latency, a given clock frequency, and the like. However, one or more parameters may be reset to their original values at the end of the retraining condition. For example, a given clock frequency and/or given voltage levels may return to their original values. Alternatively, the SMU 150 may be instructed to point to new frame buffer data, such as during a buffer swap operation, which may also be referred to as a "flip". Accordingly, the addresses stored in the address translators 114a-114c may be updated to point to the new memory locations corresponding to the new frame buffers. A further description of this process is provided later. First, a further description of the video subsystem 100 is provided.

The display devices 102a-102g may include modern TV or computer monitors that include a thin film transistor liquid crystal display (TFT-LCD) panel. Additionally, the display devices 102a-102g may include monitors for laptops and other mobile devices. Alternatively, one or more of the display devices 102a-102g may include monitors with an organic light-emitting diode (OLED) or other suitable technology.

Each of the LCD displays and the OLED displays may include an active-matrix structure that utilizes a thin-film transistor backplane to switch individual pixels on and off. The active matrix structure includes multiple row lines and multiple column lines. When a row line is selected, each of the column lines is connected to a row of pixels, wherein a single transistor may be used to implement the pixel. A row line may include hundreds to over a thousand pixels. Voltage values related to picture information may be applied to respective lines of the column lines. Afterward, the selected row line may be deselected. Following, a next row line may be selected. The screen of each of the display devices 102a-102g provides the output of the images based on the state of the pixels within each row line. One or more of the displays may utilize different timing information, such as at least a vertical blanking interval. Accordingly, the displays may be updating different rows at any given point-in-time. A further description is provided later.

A video controller may be connected between each of the display controller engines (DCEs) 112a-112c and a respective one or more of the display devices 102a-102g. Each of the display controller engines (DCEs) 112a-112c may include circuitry for sending graphics output information from the graphics memory, such as the frame buffers, via the channels 104a-104h. Alternatively, each of the DCEs 112a-112c may send graphics output information from the graphics engine 130 and/or the video engine 140 producing raster-based data results. Frame buffers are typically accessed via a memory mapping to the memory space of the graphics processor 110. The memory mappings may be stored and updated in the address translators 114a-114c. The information stored in the frame buffers may include at least color values for each pixel on the screen.

A given row line within a screen may have data corresponding to a portion of the large number of pixels within the row line stored in memory connected to memory channel 104a. Similarly, data corresponding to another portion of the large number of pixels within the same given row line may be stored in memory connected to memory channel 104b. In one example, the given row line may have data for the large number of pixels stored in an evenly distributed manner across different memory locations connected to memory channels 104a-104h. The even distribution of the data storage may allow for more efficient techniques to be used for video encoding, raster graphics and so forth.

The multiple channels 104a-104h are included in a multi-channel memory architecture. This type of architecture may increase the transfer speed of data between the memory and the memory controller 116 by adding more channels of communication between them. The multi-channel architecture utilizes multiple memory modules and a motherboard and/or video graphics card capable of supporting multiple channels. The separate channels 104a-104h allow each memory module access to the memory controller 116, which increases throughput bandwidth. Each one of the memory channels may be a separate physical memory access path, which is independently addressable from other memory access paths. Independently addressable memory channels allow less data to be read unnecessarily.

In one embodiment, each of the memory modules may have the same protocol for a respective interface to the memory controller 116. One example of a protocol is a double data rate (DDR) type of protocol. The protocol may determine values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM. The memory controller 116 may include control circuitry for interfacing to the memory channels 104a-104h and following a corresponding protocol. Additionally, the memory controller 116 may include request queues for queuing memory requests.

The interface logic 120 may communicate with other semiconductor chip designs, processing nodes, buses and input/output (I/O) devices. The interface logic 120 may follow an interface protocol that determines a bus standard, error detecting and reporting mechanisms, and signal timings. Generally, the interface logic 120 may include buffers for sending and receiving packets, data and messages.

The interface logic 120 may receive a rendering command stream, state information, and geometry data for floating point operations from a general-purpose processor core or other controller. In some embodiments, rather than providing this information directly, a processor core may provide references to locations in memory at which this information is stored. Accordingly, the graphics processor 110 retrieves the information from the specified locations.

The rendering command stream, state information, and geometry data may be used to define the desired rendered image or images, including geometry, lighting, shading, texture, motion, and/or camera parameters for a scene. In one embodiment, the geometry data includes a number of definitions for objects (e.g., a table, a tree, a person or animal) that may be present in the scene. Groups of primitives (e.g., points, lines, triangles and/or other polygons) may be used to model objects. The primitives may be defined by a reference to their vertices. For each vertex, a position may be specified in an object coordinate system, representing the position of the vertex relative to the object being modeled.

In addition to a position, each vertex may have various other attributes associated with it. Examples of other vertex attributes may include scalar or vector attributes used to determine qualities such as the color, texture, transparency, lighting, shading, and animation of the vertex and its associated geometric primitives. The graphics engine 130 may include one or more texture units for executing pixel shader programs for visual effects. The graphics engine 130 may include additional units for accelerating geometric calculations such as the rotation and translation of vertices into different coordinate systems.

The graphics engine 130 may additionally include multiple parallel data paths. Each of the multiple data paths may include multiple pipeline stages, wherein each stage has multiple arithmetic logic unit (ALU) components and operates on a single instruction for multiple data values in a data stream. The graphics engine 130 may generally execute the same programs, such as vertex shaders or pixel shaders, on large numbers of objects (vertices or pixels). Since each object is processed independently of other objects, but the same sequence of operations is used, a SIMD parallel datapath may provide a considerable performance enhancement. The graphics engine 130 may perform these and other calculations for 3D computer graphics. The video engine 140 may provide a video decoding unit to allow video decoding to be hardware accelerated. In one embodiment, the video engine 140 performs at least frequency transformations, pixel prediction and inloop deblocking, but may send the post-processing steps to the shaders in the graphics engine 130.

Once processing for a pixel or group of pixels is complete, these pixel values may be integrated with pixels of an image under construction. In some embodiments, the new pixel values may be masked or blended with pixels previously written to the rendered image. Afterward, the processed data may be sent to the DRAM for storage via both the memory hub 116 and the channels 104a-104h. At a later time, a given one of the DCEs 112a-112c reads corresponding data stored in the DRAM and sends it to a corresponding one of the display devices 102a-102g.

Figure 2:
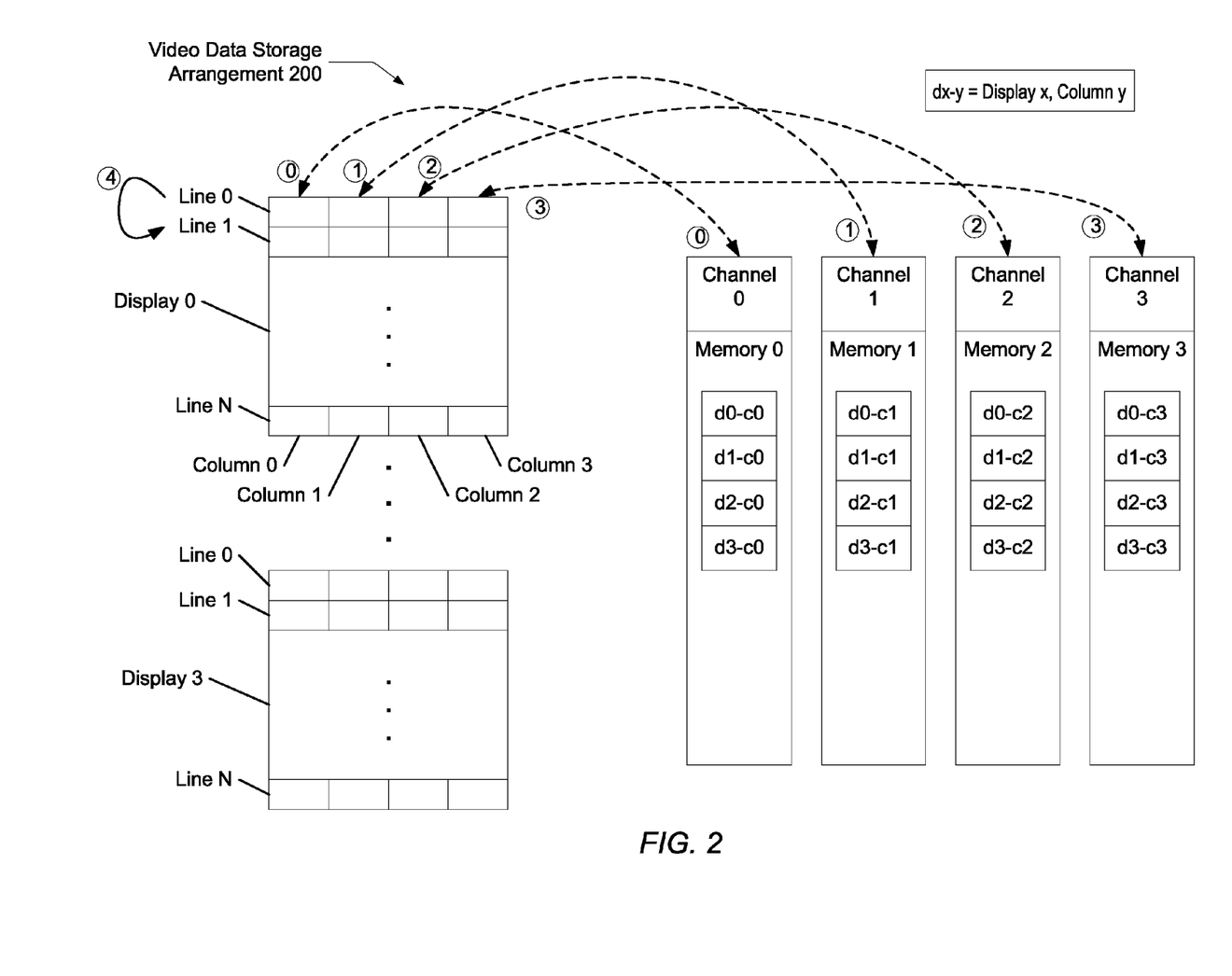
FIG. 2 is a generalized block diagram of one embodiment of video data storage arrangement.

Referring now to FIG. 2, a generalized block diagram of one embodiment of video data storage arrangement 200 is shown. Displays 0-3 have corresponding video data stored on memories 0-3. The displays 0-3 may correspond to display devices 102a-102g. The memories 0-3 may correspond to SDRAM used to store video data in frame buffers. The data stored in memories 0-3 may be accessed through channels 0-3. The channels 0-3 may utilize a protocol, such as DDR3 SDRAM, GDDR4 SDRAM, and GDDR5 SDRAM as described earlier.

Each of the displays 0-3 may include several row lines within a screen, such as lines 0-N, wherein N is an integer. Each of the lines 0-N may include hundreds to over a thousand pixels of video information. Within line 0, data for a first portion located here on the left side may be stored in memory 0. This data may be loaded into the graphics processor 110, processed, or rendered, and sent to the display 0 to be presented. Data for a second portion may be stored in memory 1. Data for a third portion may be stored in memory 2 and data for a fourth portion may be stored in memory 3. In one embodiment, each time a channel is accessed, a portion of a row line, such as 256 or 512 bytes is read out at a time.

In one example, the video information for line 0 may be divided into a number of portions equal to the number of channels. These portions are shown as columns 0-3. The even distribution of the data storage may allow for more efficient techniques to be used for video encoding, raster graphics and so forth. In another example, the video information for line 0 may be divided into chunks or segments of a given size. The segments may be assigned from left to right to the memories 0-3 in a round-robin fashion. The first four segments of the given size may be assigned to memories 0-3 in ascending order. The second set of four segments, each with the given size, may be assigned to memories 0-3 in the same ascending order, and so forth. Again, the method of data distribution may be chosen to allow for more efficient techniques to be used for video processing.

The data for display 0 and column 0 is shown as being stored in memory 0 as d0-c0. This data includes data for column 0 for each of the lines 0-N. Data for column 1 is shown as being stored in memory 1 as d0-c1. This data includes data for column 1 for each of the lines 0-N. Similarly, the data for columns 2 and 3 is shown as being stored in memories 2 and 3 as d0-c2 and d0-c3, respectively. The same notation is used for data corresponding to displays 1-3.

When display 0 is presenting an image, the row line 0 may be selected. Similarly, the displays 1-3 may simultaneously present images and row line 0 within each of the displays 1-3 may be selected. During sequence 0, corresponding video data stored in d0-c0 in memory 0 may be accessed via channel 0 and sent to the graphics processor 110 for processing. Afterward, the resulting rendered data is presented on the first portion of line 0 in display 0. At separate times typically different from sequence 0, corresponding data stored in d1-c0, d2-c0, and d3-c0 in memory 0 may be accessed via channel 0 and sent to the graphics processor 110 for processing. Afterward, the resulting rendered data is presented on the first portion of line 0 in respective displays 1-3. It is noted again that the access of data and later presentation on a given line of a display typically is asynchronous across multiple displays. The asynchronous processing and updates across the displays may be due to a different resolution, a different vertical rate (e.g. 60 Hz, 50 Hz), a different vertical blanking interval (VBI), and other dissimilar values.

During sequence 1, corresponding video data stored in d0-c1 in memory 1 may be accessed via channel 1 and sent to the graphics processor 110 for processing. Afterward, the resulting rendered data is presented on the second portion of line 0 in display 0. At separate times typically different from sequence 1, corresponding data stored in d1-c1, d2-c1, and d3-c1 in memory 1 may be accessed via channel 0 and sent to the graphics processor 110 for processing. Afterward, the resulting rendered data is presented on the second portion of line 0 in respective displays 1-3. A similar process is followed in sequences 2 and 3 for the third and fourth portions of line 0 in each of displays 0-3.

During sequence 4, row line 0 is deselected and row line 1 is selected. Following, the sequencing steps described for line 0 are repeated for line 1. Afterward, the sequencing steps are repeated for lines 2 through N. It is noted that dissimilar attributes between displays 0-3 may disallow the above-described steps to be synchronized. For example, one or more of the displays 0-3 may have a different resolution, a different vertical rate (e.g. 60 Hz, 50 Hz), a different vertical blanking interval (VBI), and other dissimilar values. Therefore, in one example, the display 3 may have data stored in d3-c1 being accessed for the second portion in line 0 prior to the display 0 having data stored in d0-c1 being accessed. In another example, the data accesses for the display 3 may lag behind the data accesses for the display 0 or other displays.

Figure 3:
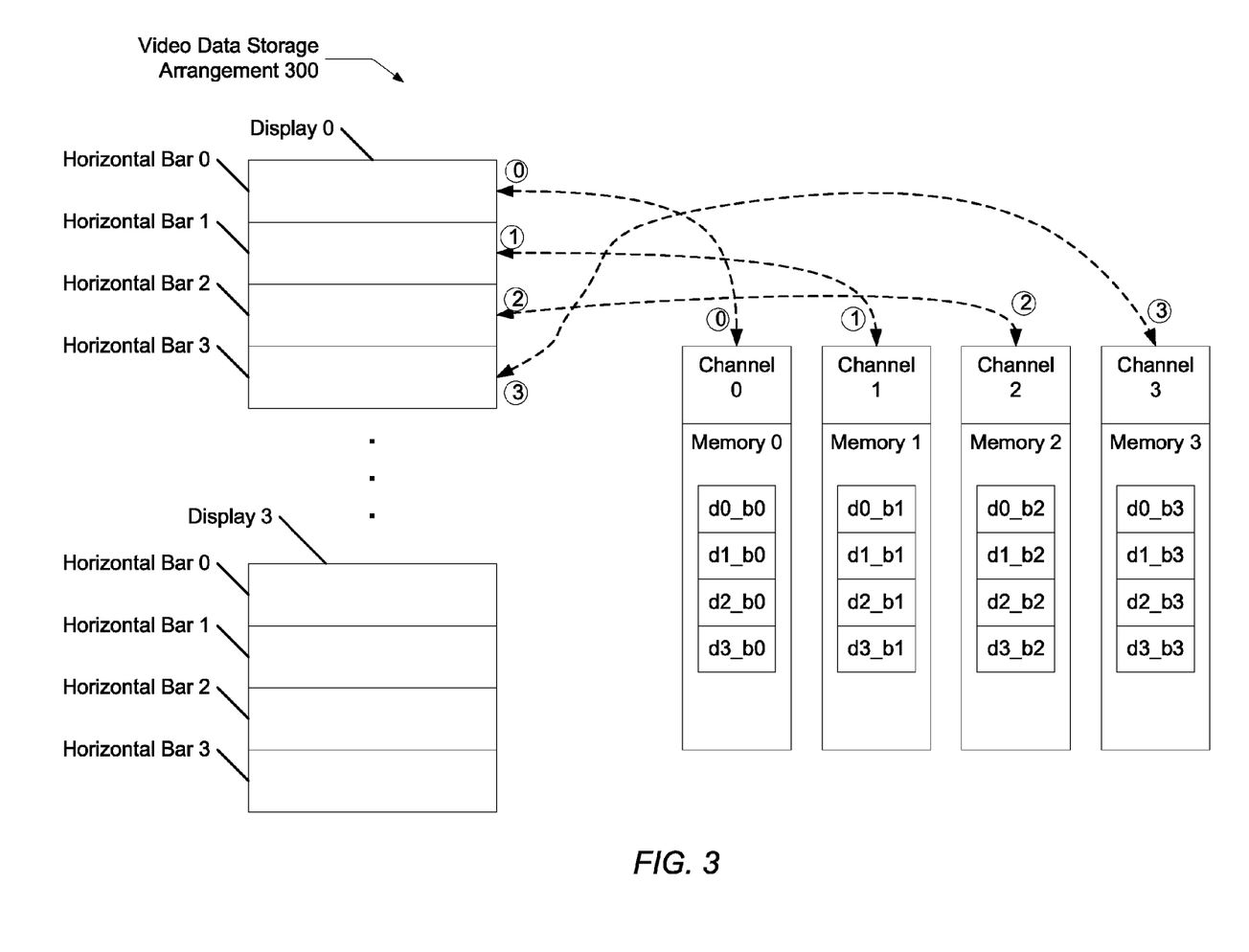
FIG. 3 is a generalized block diagram of another embodiment of video data storage arrangement.

Referring now to FIG. 3, a generalized block diagram of another embodiment of video data storage arrangement 300 is shown. Circuitry and logic described earlier are numbered identically. Here, the displays 0-3 still have corresponding video data stored on memories 0-3. In one embodiment, each of the displays 0-3 is divided into a number of horizontal bars. The number of horizontal bars may equal a number of channels. In this example, each of the displays 0-3 is divided into four horizontal bars 0-3. Each of the horizontal bars 0-3 may include multiple row lines. The video data storage arrangement 300 may be used after a retraining condition is detected and prior to actually retraining one or more of the channels 0-3.

The data for display 0 and horizontal bar 0 is shown as being stored in memory 0 as d0_b0. This data includes data for each of the multiple lines within the horizontal bar 0. Data for horizontal bar 1 is shown as being stored in memory 1 as d0_b1. This data includes data for each of the multiple lines within the horizontal bar 1. Similarly, the data for horizontal bars 2 and 3 is shown as being stored in memories 2 and 3 as d0_b2 and d0_b3, respectively. The same notation is used for data corresponding to displays 1-3.

When display 0 is presenting an image, the horizontal bar 0 may be selected. Similarly, the displays 1-3 may simultaneously present images and horizontal bar 0 within each of the displays 1-3 may be selected. During sequence 0, corresponding video data stored in d0_b0 in memory 0 may be accessed via channel 0 and sent to display 0. The time for accessing the data d0_b0 may be significantly greater than the time used for accessing the data d0-c0 previously discussed. The data represented as d0_b0 includes data for several row lines within display 0. The data represented as d0-c0 includes a portion of a single row line within display 0. This extra time may be used to provide sufficient time for retraining a given one of the channels 0-3.

When the display 0 receives the conveyed data, this rendered data is presented on the horizontal bar 0 in display 0. At a similar time as sequence 0, corresponding data stored in d1_b0, d2_b0, and d3_b0 in memory 0 may be accessed via channel 0 and sent to a respective one of the displays 1-3. Afterward, corresponding rendered data is presented on the horizontal bar 0 in respective displays 1-3. Similar actions are taken during sequences 1-3. As described earlier, dissimilar attributes between displays 0-3 may disallow the sequences 0-3 to be synchronized across displays 0-3.

Figure 4:
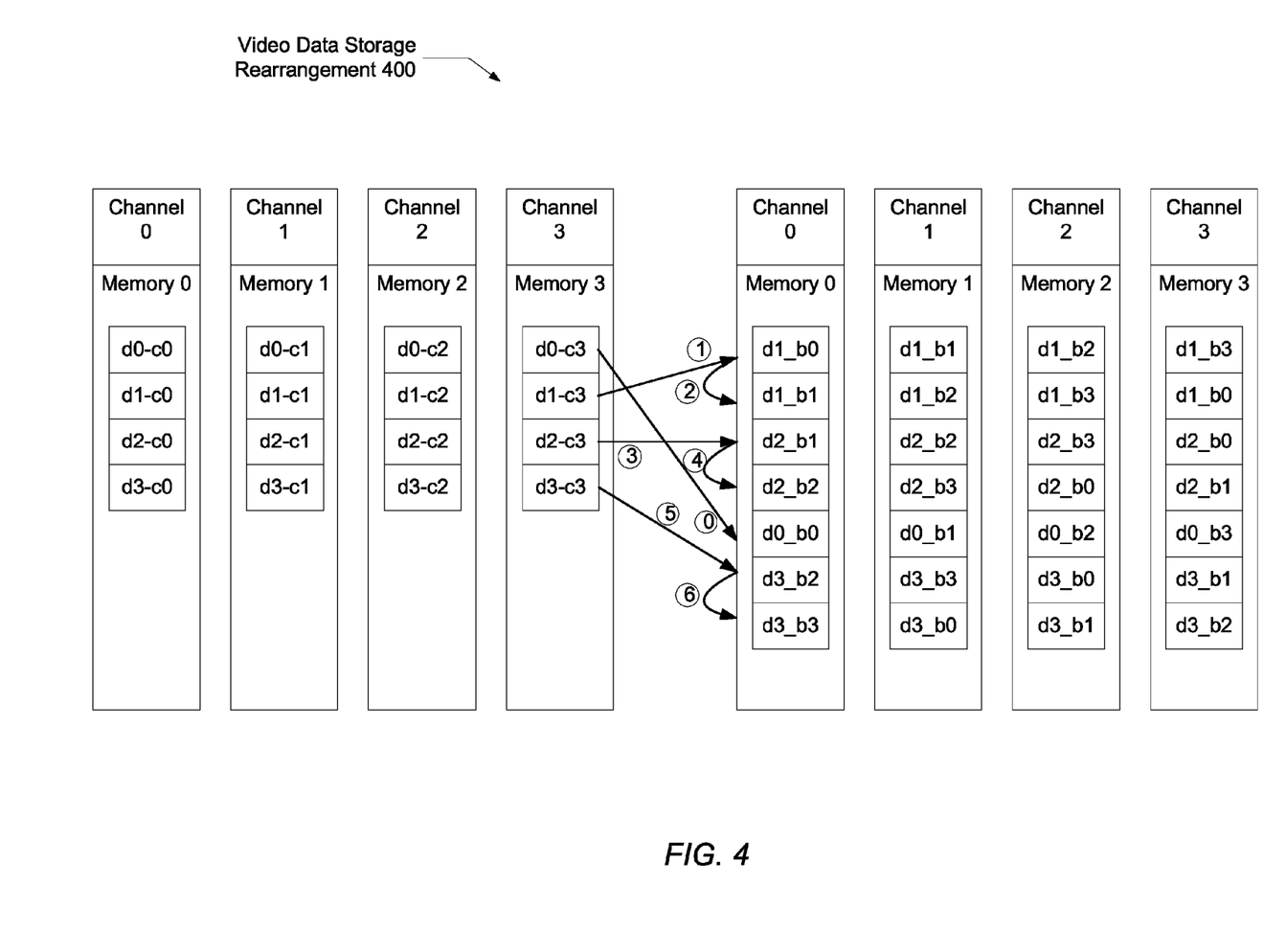
FIG. 4 is a generalized block diagram of one embodiment of video data storage rearrangement.

Turning now to FIG. 4, a generalized block diagram illustrating one embodiment of video data storage rearrangement 400 is shown. Data storage within the memories 0-3 is shown both prior to and after data rearrangement. Data rearrangement may occur responsive to detection of a retraining condition. Multiple data storage arrangements may be chosen to provide sufficient time for retraining a given one of the channels 0-3 for arbitrary timing relationship of multiple displays. Further details are provided later. Here, one chosen example of data rearrangement is shown. Other examples are shown and described later.

As shown, each of the memories 0-3 stores video data for displays 0-3 as described earlier regarding the video data storage arrangement 200. During sequence 0, the data in memories 0-3 corresponding to the multiple lines within a horizontal bar 0 in display 0 is copied to the data indicated by d0_b0 in memory 0. This data may come from a portion of each of the memory locations indicated by d0-c0 to d0-c3. Similarly, during sequence 0, the data in memories 0-3 corresponding to the multiple lines within a horizontal bar 1 in display 0 is copied to the data indicated by d0_b1 in memory 1. This data may come from a portion of each of the memory locations indicated by d0-c0 to d0-c3.

In a similar manner, during sequence 0, the data in memories 0-3 corresponding to the multiple lines within the horizontal bars 2 and 3 in display 0 is copied to the data indicated by d0_b2 and d0_b3 in memories 2 and 3, respectively. This data may come from a portion of each of the memory locations indicated by d0-c0 to d0-c3. The memory locations for d0_b0 to d0_b3 may be chosen to allow the prior data to continue to be accessed without interruption even during retraining of any single memory channel during which time only that channel is inaccessible. The remapped address locations may be updated in the address translators 114a-114c in each of the DCEs 112a-112c. During the rearrangement of data, for a short time, all other memory accesses may be suspended or otherwise delayed. In addition, a buffer swap operation, which may also be referred to as a "flip", may be suspended during the rearrangement of data.

During sequences 1-6, the data corresponding to horizontal bars 0-3 in displays 1-3 may be copied to unused memory locations in memories 0-3. The data in these unused memory locations may have been recently copied to other locations and remapped, thus, allowing reuse of memory locations. In the embodiment shown, two copies of data corresponding to display 1-3 are created and stored in different memories. For example, two copies of the data corresponding to display 1 may be created during sequences 1 and 2.

During sequence 1, the data in memories 0-3 corresponding to the multiple lines within a horizontal bar 0 in display 1 is copied to the data indicated by d1_b0 in memory 0. This data may come from a portion of each of the memory locations indicated by d1-c0 to d1-c3. Similarly, during sequence 1, the data in memories 0-3 corresponding to the multiple lines within a horizontal bar 1 in display 1 is copied to the data indicated by d1_b1 in memory 1. This data may come from a portion of each of the memory locations indicated by d1-c0 to d1-c3. Similarly, during sequence 1, the data in memories 0-3 corresponding to the multiple lines within the horizontal bars 2 and 3 in display 1 is copied to the data indicated by d1_b2 and d1_b3 in memories 2 and 3, respectively. This data may come from a portion of each of the memory locations indicated by d1-c0 to d1-c3. The memory locations for d1_b0 to d1_b3 may be chosen to reuse the memory locations previously used by the data corresponding to display 0. The remapped address locations may be updated in the address translators 114a-114c in each of the DCEs 112a-112c.

During sequence 2, a copy of the data corresponding to display 1 may be created. The data indicated by d1_b0 in memory 0 may be copied to the data indicated by d1_b0 in memory 3. Similarly, the data indicated by d1_b1 in memory 1 may be copied to the data indicated by d1_b1 in memory 0. In a similar manner, the data indicated by d1_b2 in memory 2 and d1_b3 in memory 3 may be copied to the data indicated by d1_b2 in memory 1 and d1_b3 in memory 2, respectively. The memory locations for the copies of d1_b0 to d1_b3 may be chosen to reuse the memory locations previously used by the data corresponding to display 1, such as d1-c0 to d1-c3. The address locations of the copies may be updated in the address translators 114a-114c in each of the DCEs 112a-112c. During sequences 3-6, similar steps may be taken to rearrange and create copies for data corresponding to displays 2 and 3. The copies of data for each of the displays 0-3 are placed in a different memory than where the original data is stored. The use of this data rearrangement for retraining memory channels is described next.

Figure 5:
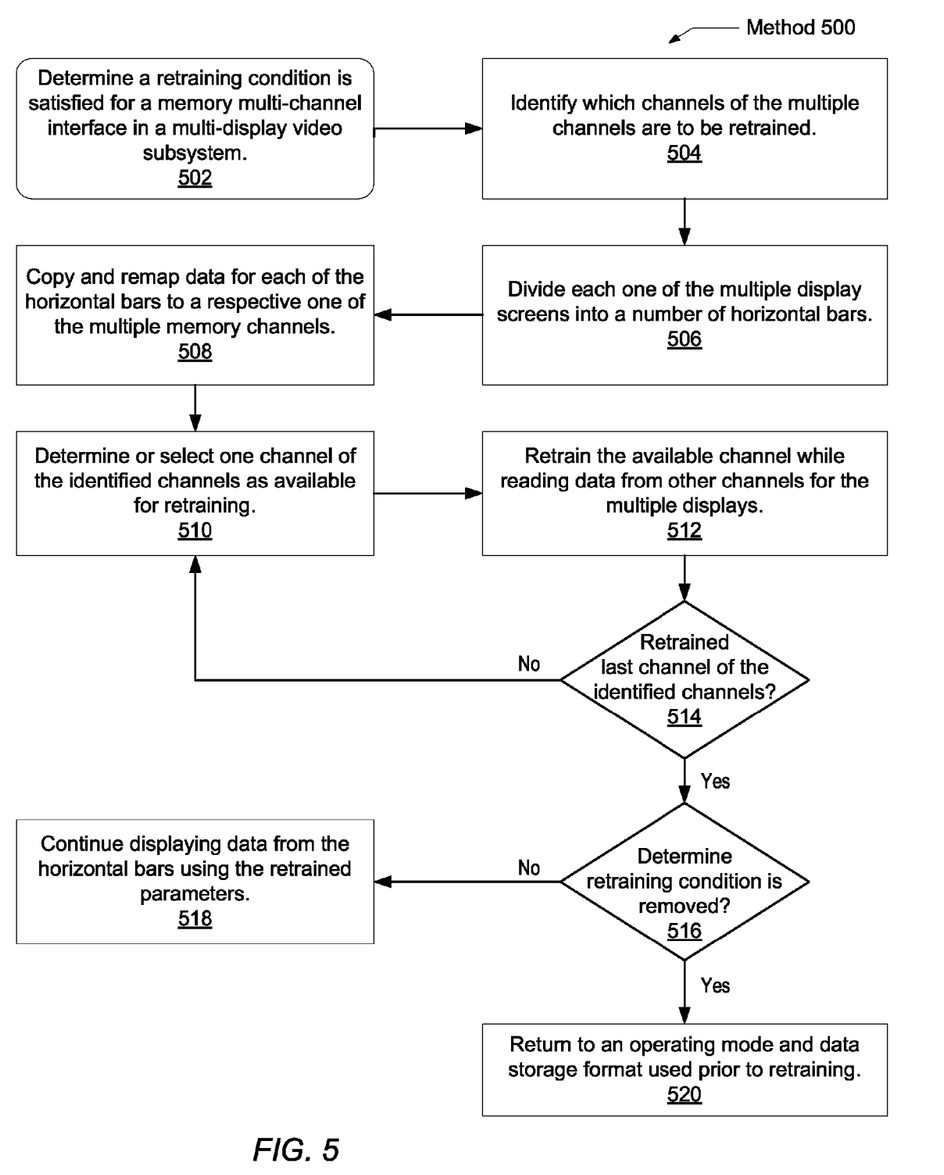
FIG. 5 is a generalized flow diagram of one embodiment of a method for efficient memory channel retraining.

Referring now to FIG. 5, a generalized flow diagram of one embodiment of a method 500 for efficient memory channel retraining is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 502, a determination is made that a retraining condition is satisfied for a memory interface in a multi-display video subsystem. The memory interface is also referred to as a memory channel, such as channels 104a-104h shown in FIG. 1 and channels 0-3 shown in FIG. 2-4. One example of a retraining condition is an indication of a request for a performance state change. The request for a performance state change may be due to detection of a change in user activity. In such a case, the memory clock (MCLK) frequency may be reduced or increased during a retraining session. Another example of a retraining condition is a memory interface determining an error rate exceeds a given threshold. Yet another example of a retraining condition is an indication the substrate temperature and/or a power consumption exceed a given threshold. In such cases, one or more interface signals may have delays and phases changed to fix potential errors and reduce power consumption. In addition, one or more clock frequencies, such as the MCLK frequency, may be reduced.

In block 504, one or more channels of the multiple channels are identified as channels to be retrained. In one example, each of the multiple channels may be identified responsive to detecting an idle power state. In another example, each of the multiple channels may be identified responsive to detecting excessive power consumption. In yet another example, one or more channels of the multiple channels may be identified responsive to detecting a high error rate within these particular one or more channels.

In block 506, each one of the multiple display screens may be divided into a number of horizontal bars. In one embodiment, a number of horizontal bars may equal a number of memory channels. In block 508, corresponding video data may be copied and remapped for each one of the horizontal bars to a respective one of the multiple memory channels. Referring briefly again to FIG. 3 and FIG. 4, examples of this data rearrangement are shown. Other examples are later shown and described in FIG. 7-9. The selection of a type of data rearrangement to use may be based on several criteria. The criteria may include at least a comparison between a number of multiple displays and a number of multiple channels, an amount of available memory, time to perform the channel retraining, data transfer rate between the memories and channels, signal bus availability and so forth.

In block 510, one channel of the identified channels is selected as available for retraining. In some embodiments, it is known which channel is an upcoming available channel. In other embodiments, an analysis may be performed to determine which channel is an upcoming available channel for retraining. As an example, the video data rearrangement 400 is used to illustrate one embodiment of such a determination.

Referring again to FIG. 4, a current channel that display 0 is currently accessing may be determined as an upcoming available channel for retraining. In one example, display 0 may be currently accessing the data indicated by d0_b0 stored in memory 0. Afterward, when display 0 begins accessing the data indicated by d0_b1 stored in memory 1, a retraining session for the channel 0 may begin. Due to differences in display characteristics, such as resolution, a check may be performed to verify no other display of the displays 1-3 is still accessing memory 0. If one or more of the other displays 1-3 is still accessing memory 0, a wait may occur until no displays of the displays 0-3 is accessing memory 0.

The display 0 does not again access memory 0 until it has accessed video data indicated by d0_b1, d0_b2 and d0_b3 in memories 1-3. Therefore, a retraining session may have more than sufficient time to complete before display 0 again accesses through channel 0 the data indicated by d0_b0 in memory 0. By the time display 0 returns to memory 0, the channel 0 may be already retrained. For example, the MCLK frequency for channel 0 may be reduced.

In block 512 of FIG. 5, the identified available channel may be retrained while data is read from other channels for the multiple displays. During a retraining session for channel 0, if any of the other displays 1-3 is scheduled to access data in memory 0, these displays may access a copy of the respective data in another memory. For example, if display 2 has finished accessing the data indicated by d2_b0 and display 2 is scheduled to next access the data indicated by d2_b1, then the display 2 may access a copy of this data in memory 3, rather than the copy stored in memory 0. Later, when the display 0 has finished accessing the data indicated by d0_b1 stored in memory 1, then the channel 1 may be identified as a next channel to retrain.

If the last channel of the identified channels has not been retrained (conditional block 514), then control flow of method 500 returns to block 510. For example, each of the channels 0 and 1 may have been retrained. When display 0 has finished accessing the data indicated by d0_b2 in memory 2 and moves to the data indicated by d0_b3 stored in memory 3, the channel 2 may be identified as a next channel to retrain.

If the last channel of the identified channels has been retrained (conditional block 514), and the retraining condition has not been removed (conditional block 516), then in block 518, the video data stored in the memories 0-3 may continue to be accessed as horizontal bars using the retrained parameters. One example of a retrained parameter is the reduced MCLK frequency. Another example is a change in a delay or a phase of one or more interface signals. The retraining condition may include a preferred performance state change, an excessive power consumption condition change, an excessive error rate change, and so forth. The retraining condition may remain for a variable amount of time.

If the retraining condition has been removed (conditional block 516), then in block 520, the video subsystem may return to an operating mode and data storage format used prior to retraining. For example, the retraining steps may be repeated, but during the retraining session, the parameters may be returned to prior values. For example, the MCLK frequency may be changed from a reduced value to a prior value, such as its maximum frequency used prior to determining a retraining condition is satisfied. In other examples, the parameters may remain at their current values. For example, if an error rate has been reduced, then the delay and phase changes for particular interface signals may continue to be used to maintain a lower error rate below a given threshold.

In one embodiment, the video data may be rearranged to return to the storage arrangement used prior to retraining. For example, the data storage arrangement may return to the video storage arrangement 200 shown in FIG. 2. In another embodiment, new frame buffers may be available and the data arrangement of the new frame buffers may be used. The new frame buffers may use the data arrangement shown in FIG. 2 with new data values. The address translators 114a-114c in the graphics processor 110 may be updated with the address information corresponding to the new frame buffers.

Figure 6:
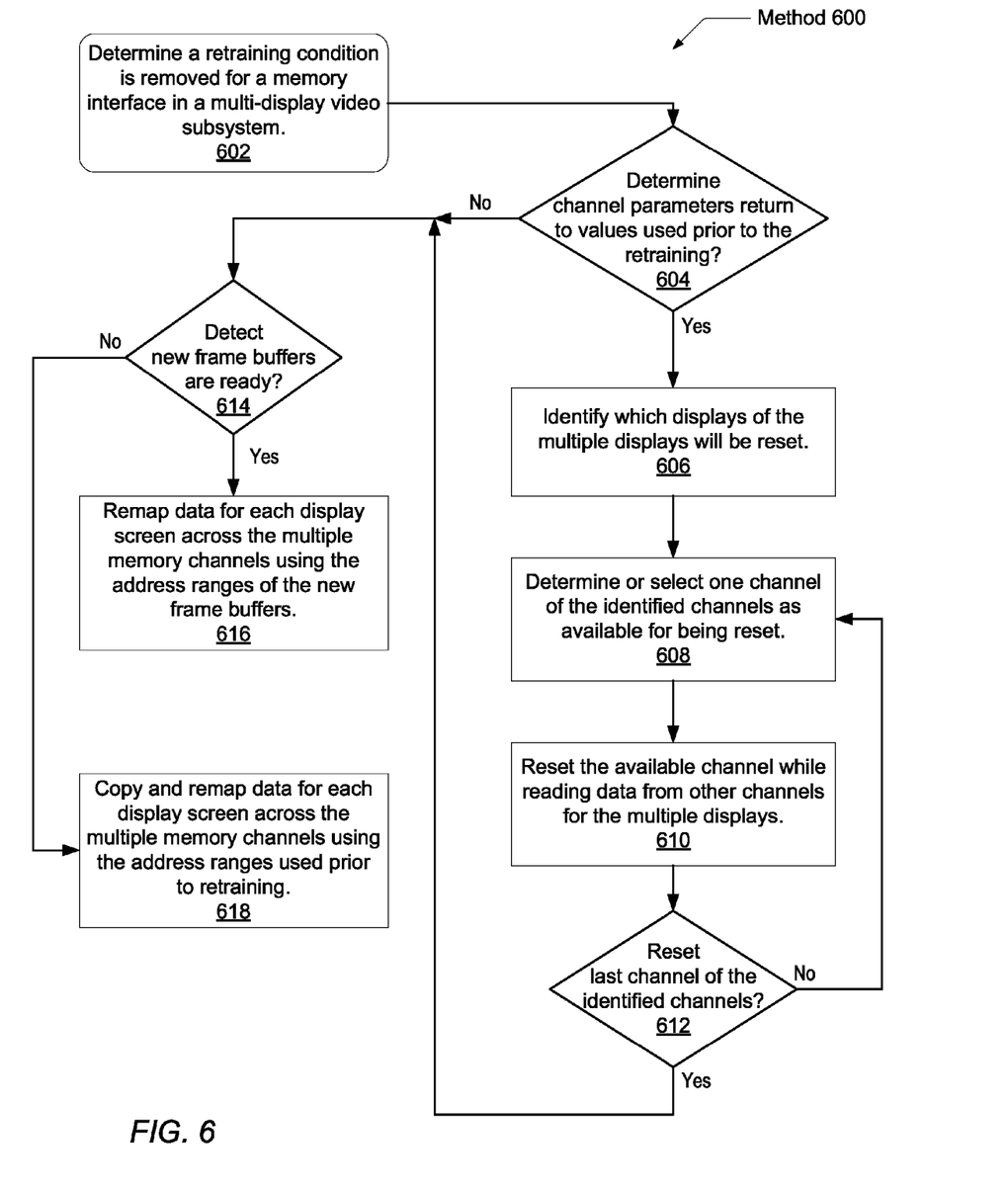
FIG. 6 is a generalized flow diagram of one embodiment of a method for efficient resetting after a memory channel retraining.

Before describing other video data storage arrangements, other than the data storage rearrangement 400, that may be used during retraining of the memory channels, a further description is provided of the steps used after a retraining condition is removed. Referring now to FIG. 6, a generalized flow diagram of one embodiment of a method 600 for efficient resetting after a memory channel retraining is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 602, a retraining condition is removed for a memory interface in a multi-display video subsystem. As described earlier, the retraining condition may include a request for a performance state change, an excessive power consumption condition change, an excessive error rate condition change, and so forth. The memory channel parameters may be returned to prior values. For example, the MCLK frequency may be changed from a reduced value to a prior value, such as its maximum frequency used prior to determining a retraining condition is satisfied. In other examples, the parameters may remain at their current values. For example, if an error rate has been reduced, then the delay and phase changes for particular interface signals may continue to be used to maintain a lower error rate below a given threshold.

If the memory channel parameters are determined to be returned to values used prior to the retraining (conditional block 604), then in block 606, one or more channels of the multiple channels are identified as channels to be adjusted or reset. In one example, each of the multiple channels may be identified responsive to detecting a low power state is removed. In another example, each of the multiple channels may be identified responsive to detecting an excessive power consumption condition has ended. In yet another example, one or more channels of the multiple channels may be identified responsive to detecting a high error rate within these particular one or more channels has descended below a given threshold.

In block 608, one channel of the identified channels is selected as available for being reset. The method and mechanism used here may be similar to the steps described earlier taken in block 510 of method 500. In block 610, the identified available channel may have a channel parameter reset to a prior value while data is read from other channels for the multiple displays. The method and mechanism used here may be similar to the steps described earlier taken in block 512 of method 500.

If the last channel of the identified channels has not been reset (conditional block 612), then control flow of method 600 returns to block 608. If the last channel of the identified channels has been reset (conditional block 612), and one or more new frame buffers are detected to be available for one or more of the displays 0-3 (conditional block 614), then in block 616, the data for each of the corresponding displays may be remapped to the address ranges of the new frame buffers.

In one example, a flip command, a next present call, a next swap buffer call, or similar indication may be received and addresses are changed to address ranges corresponding to the new frame buffers. The address translators 114a-114c within the graphics processor 110 may have address values updated. Typically, each of the displays 0-3 change to using data in new frame buffers at a same time. However, it is possible and contemplated that one or more of the displays 0-3 change to using data in new frame buffers while other displays of the displays 0-3 continue using data used prior to the retraining session.

If no new frame buffers are detected to be available for one or more of the displays 0-3 (conditional block 614), then in block 618, the data for each of the displays may be rearranged to return to the storage arrangement used prior to retraining. For example, the data storage arrangement may return to the video storage arrangement 200 shown in FIG. 2.

Figure 7:
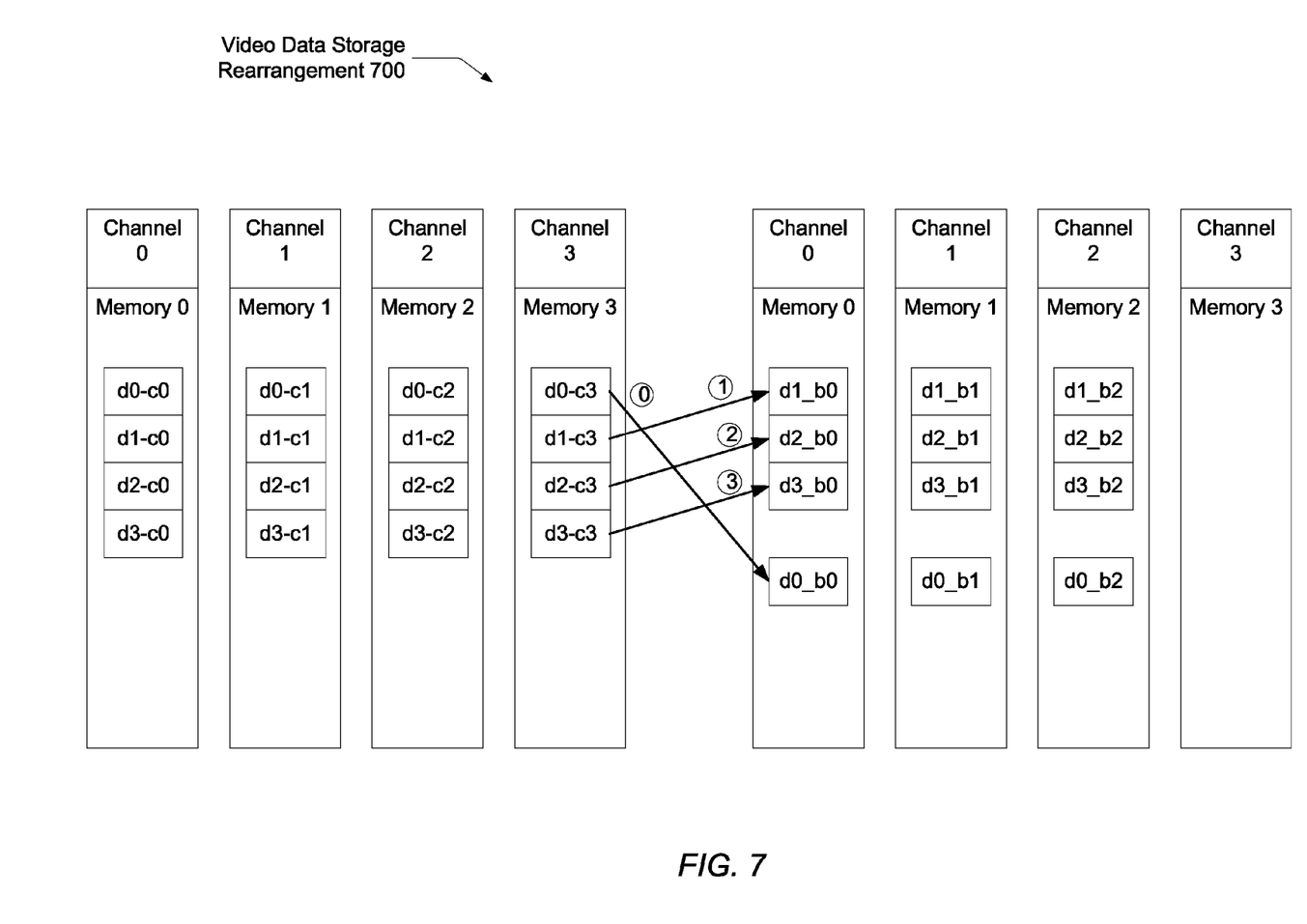
FIG. 7 is a generalized block diagram of another embodiment of video data storage rearrangement.

In block 508 of method 500, a data storage rearrangement is performed prior to retraining one or more channels of multiple memory channels. The data storage rearrangement 400 in FIG. 4 is used as an illustrative example. Other data rearrangements may be used and some are described here. Turning now to FIG. 7, a generalized block diagram illustrating another embodiment of video data storage rearrangement 700 is shown. Referring again to FIG. 2 and FIG. 3, an example with 4 displays 0-3 and 4 memory channels 0-3 is used to illustrate the steps used to rearrange data prior to retraining one or more channels of multiple channels. Other numbers of multiple displays and channels are possible and contemplated.

Referring to FIG. 7, the data storage within the memories 0-3 is shown both prior to and after data rearrangement. Data rearrangement may occur responsive to detection of a retraining condition. Each of the memories 0-3 stores video data for displays 0-3 as described earlier regarding the video data storage arrangement 200. In this embodiment, each screen of the displays 0-3 is divided into a number of horizontal bars. However, the number of horizontal bars fewer than the number of memory channels (the number of horizontal bars is equals the number of memory channels minus one in this example). In this example, the number of horizontal bars is three, rather than four as used in prior descriptions. Such an approach may be used to create a free channel (e.g., channel 3).

During sequence 0, the data in memories 0-3 corresponding to the multiple lines within a horizontal bar 0 in display 0 is copied to the data indicated by d0_b0 in memory 0. The amount of information stored in the data indicated d0_b0 may correspond to a third of a screen for display 0, rather than a fourth of the screen as described in earlier descriptions. Similarly, during sequence 0, the data in memories 0-3 corresponding to the multiple lines within a horizontal bar 1 in display 0 is copied to the data indicated by d0_b1 in memory 1. This data may come from a portion of each of the memory locations indicated by d0-c0 to d0-c3.

In a similar manner, during sequence 0, the data in memories 0-3 corresponding to the multiple lines within the horizontal bar 2 in display 0 is copied to the data indicated by d0_b2 in memory 2. The memory 3 may not store any information for the display 0 after the data rearrangement. The remapped address locations may be updated in the address translators 114a-114c in each of the DCEs 112a-112c.

During sequences 1-3, the data corresponding to horizontal bars 0-2 in displays 1-3 may be copied to unused memory locations in memories 0-2. The data in these unused memory locations may have been recently copied to other locations and remapped, thus, allowing reuse of memory locations. After the data rearrangement is complete, the channel 3 may be selected as an available channel to retrain. This selection and the corresponding retraining may be performed as described earlier regarding blocks 508-510 in method 500.

Figure 8:
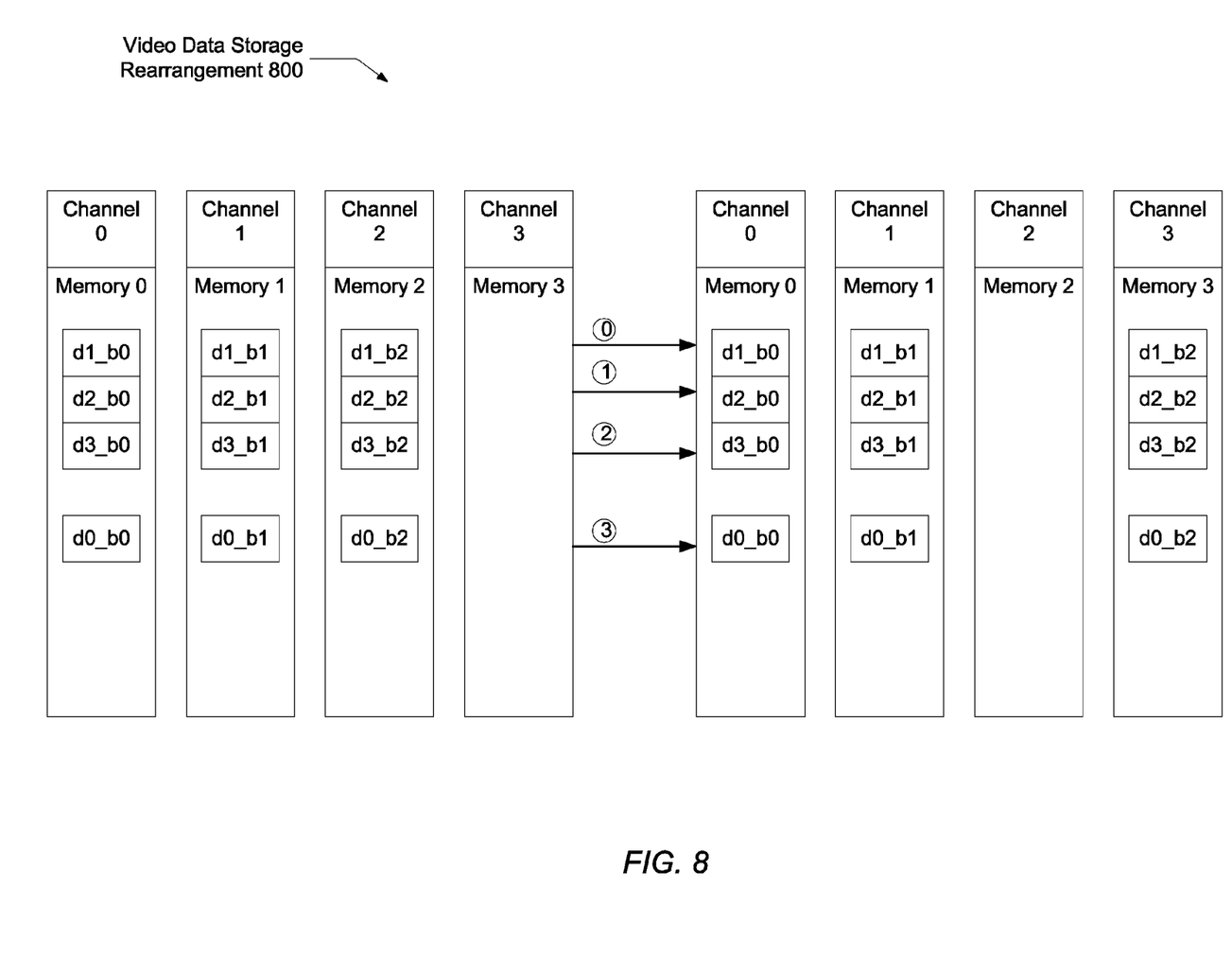
FIG. 8 is a generalized block diagram of another embodiment of video data storage rearrangement.

When the retraining of channel 3 is completed, the data stored in memories 0-2 may be rearranged again to provide a next available channel to be retrained. Referring now to FIG. 8, a generalized block diagram illustrating one embodiment of video data storage rearrangement 800 is shown. The rearrangement shown in FIG. 8 may occur after detecting a retraining session for channel 3 has completed for the data storage rearrangement 700. The data stored in memory 2 may be copied to memory 3. After the copying and remapping steps, the channel 2 may be identified as a next available channel of the channels 0-3 to be retrained. This procedure may be repeated until each channel identified channel for retraining has been retrained.

Figure 9:
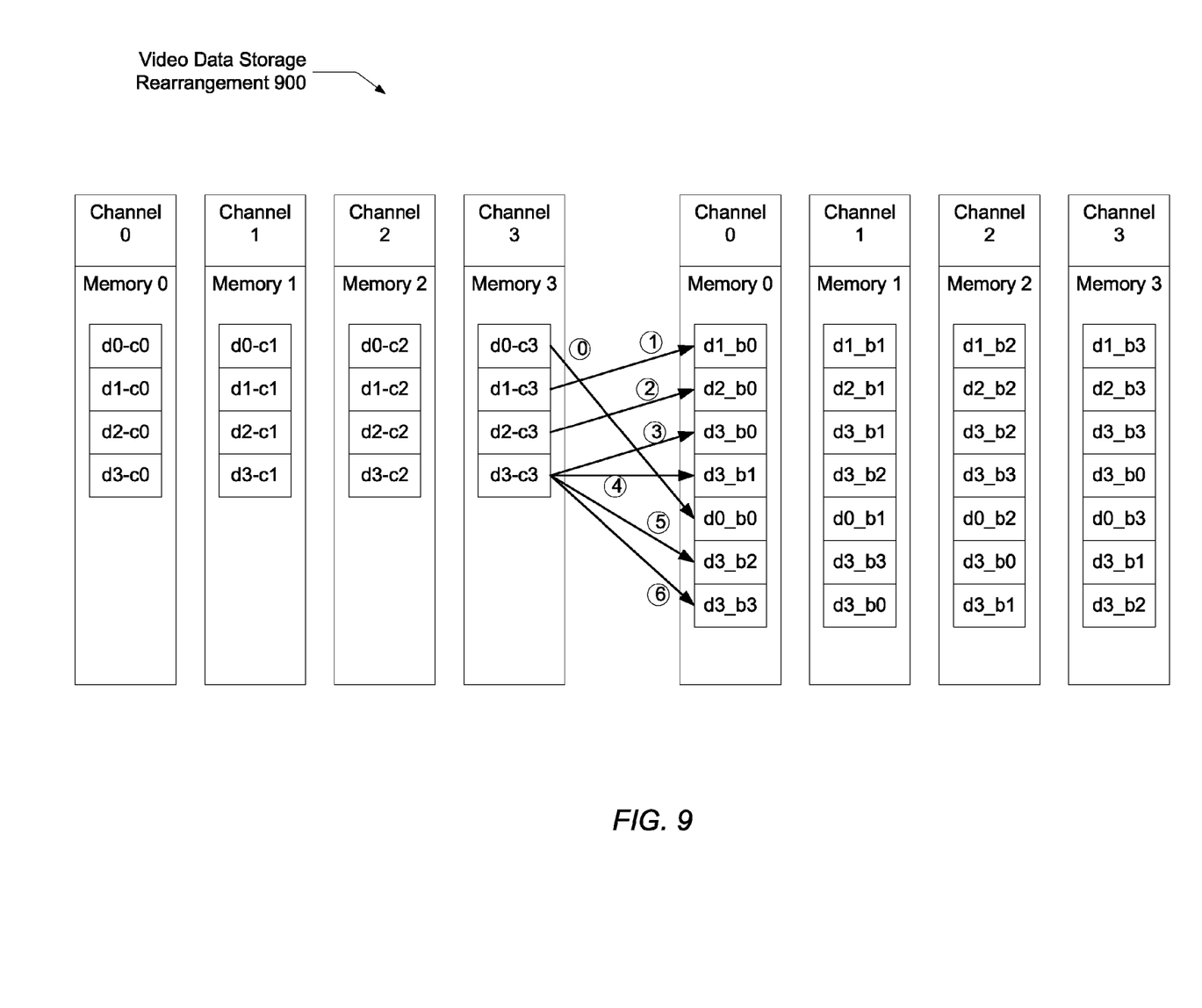
FIG. 9 is a generalized block diagram of yet another embodiment of video data storage rearrangement.

Turning now to FIG. 9, a generalized block diagram illustrating yet another embodiment of video data storage rearrangement 900 is shown. Referring again to FIG. 2 and FIG. 3, an example with 4 displays 0-3 and 4 memory channels 0-3 is used to illustrate the steps used to rearrange data prior to retraining one or more channels of multiple channels. Other numbers of multiple displays and channels are possible and contemplated.

In FIG. 9, data storage within the memories 0-3 is shown both prior to and after data rearrangement. Data rearrangement may occur responsive to detection of a retraining condition. Each of the memories 0-3 stores video data for displays 0-3 as described earlier regarding the video data storage arrangement 200. In this embodiment, each screen of the displays 0-3 is divided into a number of horizontal bars. The number of horizontal bars may equal a number of memory channels.

During sequence 0, the data in memories 0-3 corresponding to the multiple lines within a horizontal bar 0 in display 0 is copied to the data indicated by d0_b0 in memory 0. The data copying steps performed in the remainder of sequence 0 and during sequences 1-3 may occur in a similar manner as described earlier regarding the video data storage rearrangement 400. During sequences 4-6, multiple copies of the data corresponding to display 3 are created across the memories 0-3. An available channel for retraining may be determined based on a free channel not being used by displays 0-2. The display 3 may use any one of the channels 0-3 at any given time. Therefore, the display 3 may not be considered when searching for an upcoming channel available for retraining.

Figure 10:
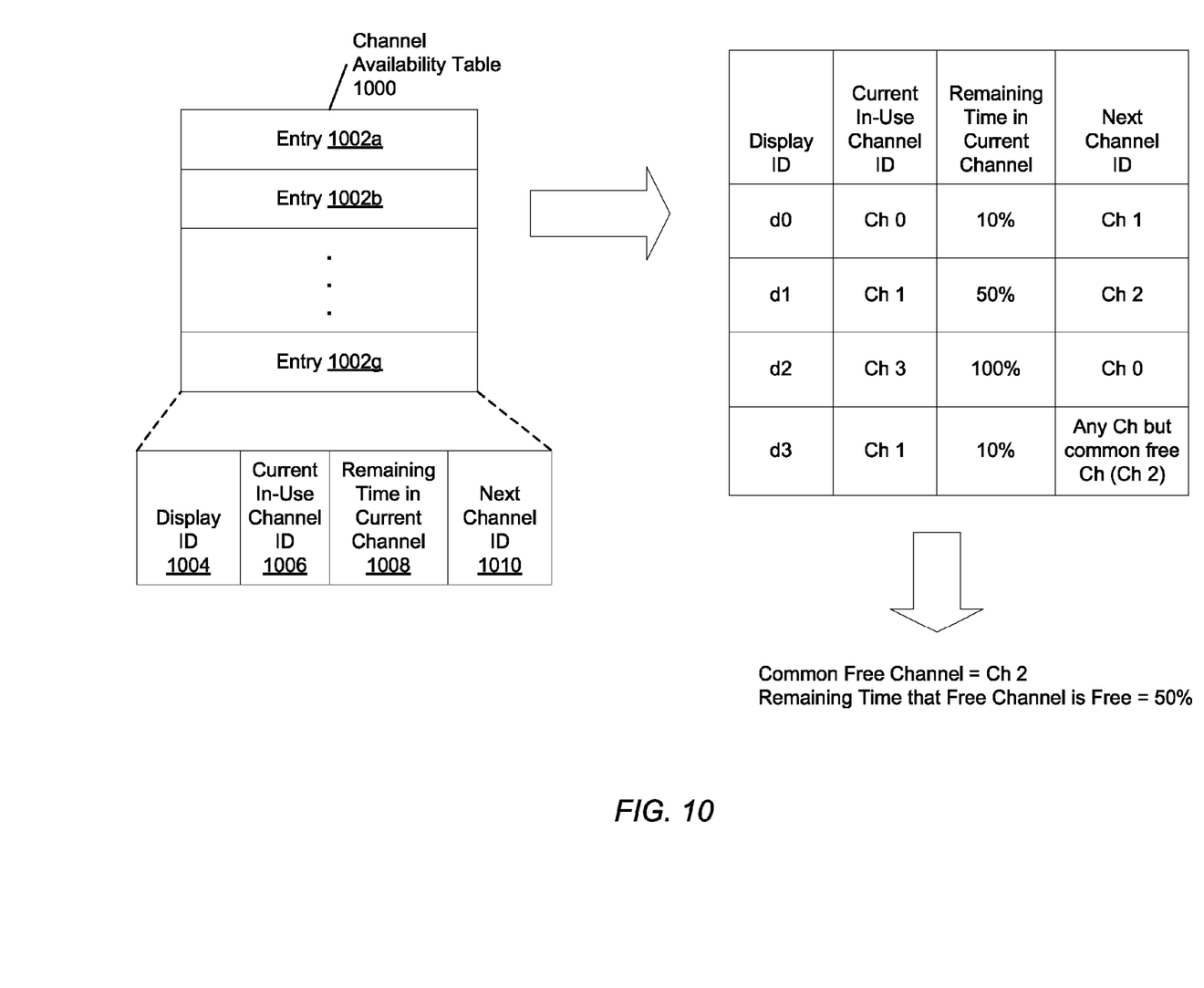
FIG. 10 is a generalized block diagram of one embodiment of a channel availability table.

Turning now to FIG. 10, a generalized block diagram of one embodiment of a channel availability table 1000 is shown. The table 1000 may be used to determine an upcoming available channel for the video data storage rearrangement 900. The table 1000 may be updated by the DCEs 112a-112c and control logic that at least maintains which one of the multiple channels have already been retrained. The table 1000 includes multiple entries 1002a-1002g. Each entry may include at least the fields 1004-1010. The field 1004 may store a display identifier (ID) corresponding to one of multiple displays used in a multi-display video subsystem. In the example used for data storage rearrangement 900, the field 1004 may store an identifier for one of the displays 0-3.

The field 1006 may store an identifier (ID) of a currently in-use memory channel corresponding to the display ID stored in field 1004. An example is shown in FIG. 10. For displays 0-3, a currently in-use channel is identified in the table. For example, display 0 may be currently accessing memory 0 through channel 0. Each of displays 1 and 3 may be currently accessing memory 1 through channel 1. Display 2 may be currently accessing memory 3 through channel 3.

The field 1008 may store an estimated remaining time to use the current channel. The estimated time may be a relative or normalized value, a percentage value, or other representation. Alternatively, the field 1008 may store a time stamp indicating an expected time to transition to a next channel. The filed 1010 may store an ID of a next channel to access for data. For the particular display 3, which has multiple copies stored in the memories 0-3, a valid identifier may not be relevant. The display 3 is capable of accessing any one of the memories 0-3 through channels 0-3 and it is not limited to a particular next channel.

The data stored in the table 1000 may be used to determine any available upcoming free channel to retrain. In the example shown, channel 2 is currently unused and is available for 50% of a given remaining time. This 50% value may be a sufficient amount of time to retrain a channel. Therefore, based on the information in table 1000, a retraining session for channel 2 shown in the data storage arrangement 900 may begin. The display 3 may access any channel except channel 2 as a next channel. In this example, if the time of availability for channel 2 is insufficient to perform retraining, then a free channel may not be found yet.

Although display 3 is shown as having multiple copies of its data stored on each of the memories 0-3, another display may be chosen. Additionally, although a single display, such as display 3, is shown as having an entire copy of its data stored in each of the memories 0-3, it is possible and contemplated to create an entire copy of data corresponding to two or more of the displays stored in each of the memories 0-3. Similar to the data storage rearrangements 400 and 700, a selection of a combination to use may be based on design tradeoffs. The tradeoffs may include at least an amount of available memory, time to perform the retraining, data transfer rate between the memories and channels, signal bus availability and so forth. Further, if a video subsystem includes more displays than channels, each additional display may have an entire copy of its data stored in each of the memories 0-3.

In another embodiment, rather than using the table 1000 to determine a free channel, the SMU 150, another microcontroller, or other control circuitry may select a free channel, broadcast a message to each of the displays 0-2 that channel 2 is unavailable, and wait to receive an acknowledgment from each of the displays 0-2. Display 3 may not receive this broadcast message, since the display 3 may access any one of the channels 0-3 to obtain data. When the control circuitry receives an acknowledgment from each of the displays 0-2, it may retrain channel 2. Afterward, the control circuitry may send a broadcast message to each of the displays 0-2 that channel 2 is once again available. Then the process may repeat until all identified channels for retraining are retrained.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a memory hub configured to be coupled to a memory including a plurality of memory channels; and
a system manager unit (SMU);
wherein in response to determining a retraining condition is satisfied for one or more channels of the plurality of memory channels, the SMU is configured to:
read data from the memory that corresponds to two or more memory channels;
write the data back to the memory such that the data corresponds to a single channel of the plurality of memory channels; and
store data for a plurality of horizontal bars across a plurality of memory channels.

2. The processor as recited in claim 1, wherein the processor further comprises a display controller engine (DCE), wherein the DCE is configured to remap addresses for data that has been rearranged in the memory.

3. The processor as recited in claim 1, wherein the SMU is further configured to identify a given channel of the plurality of channels is a free channel responsive to determining the given channel will not be utilized for an estimated duration of time sufficient to complete retraining.

4. The processor as recited in claim 3, wherein the SMU is further configured to retrain the free channel.

5. The processor as recited in claim 4, wherein to retrain the free channel the SMU is configured to perform at least one of the following: adjust a frequency of a memory clock (MCLK), adjust a phase, a delay and/or a voltage level of one or more memory interface signals.

6. The processor as recited in claim 4, wherein the retraining condition comprises at least one of the following: a video idle mode, a measured power consumption exceeds a given threshold, and an error rate for one or more memory channels surpasses a given threshold.

7. The processor as recited in claim 4, wherein in response to determining the retraining condition is removed, the SMU is further configured to restore settings adjusted during retraining of a channel to values used prior to retraining.

8. The processor as recited in claim 7, wherein the processor further comprises a display controller engine (DCE) coupled to one or more display devices, wherein in response to an indication new data is ready for a display device of the one or more display devices, the DCE is configured to remap addresses of the new data.

9. A method for use in a system configured to generate data for a display device, the method comprising:
responsive to determining a retraining condition is satisfied for one or more channels of a plurality of memory channels:
reading given data from a memory that corresponds to two or more memory channels; and
writing the given data back to the memory such that the data corresponds to a single channel of the plurality of memory channels; and
storing data for a plurality of horizontal bars across a plurality of memory channels.

10. The method as recited in claim 9, further comprising remapping addresses for rearranged data.

11. The method as recited in claim 10, wherein the data read from the two or more memory channels is then written to correspond to fewer memory channels than the two or more memory channels.

12. The method as recited in claim 11, further comprising:
retraining a memory channel corresponding to data not included in the horizontal bars.

13. The method as recited in claim 10, wherein a number of the plurality of horizontal bars corresponding to a given display device is equal to a number of the plurality of memory channels.

14. The method as recited in claim 13, further comprising storing a copy of data on each memory channel for each horizontal bar corresponding to a first number of display devices, wherein the first number is less than the number of the plurality of memory channels plus one.

15. The method as recited in claim 14, further comprising:
determining a given channel will not be utilized for an estimated duration of time sufficient to complete retraining; and
retraining the given channel.

16. The method as recited in claim 13, further comprising storing two copies of data on each memory channel for each horizontal bar.

17. The method as recited in claim 16, further comprising:
determining a given channel is a most recent one of the plurality of memory channels to be accessed; and
retraining the given channel.

18. A computer system comprising:
a memory configured to support a plurality of memory channels; and
a processing unit;
wherein in response to determining a retraining condition is satisfied for one or more channels of the plurality of memory channels, the processing unit is configured to:
read data from the memory that corresponds to two or more memory channels; and
write the data back to the memory such that the data corresponds to a single channel of the plurality of memory channels;
store data for a plurality of horizontal bars across a plurality of memory channels.

19. The computer system as recited in claim 18, wherein the processing unit is further configured to determine a channel of the plurality of channels is a free channel in response to determining the given channel will not be utilized for an estimated duration of time sufficient to complete retraining.

20. The computer system as recited in claim 19, wherein the processing unit is further configured to adjust a frequency of a memory clock (MCLK) for the identified free channel.

* * * * *